(12) United States Patent
Sankaran et al.

(10) Patent No.: US 9,471,494 B2
(45) Date of Patent: Oct. 18, 2016

(54) METHOD AND APPARATUS FOR CACHE LINE WRITE BACK OPERATION

(71) Applicant: Intel Corporation, Santa Clara, CA (US)

(72) Inventors: Rajesh M. Sankaran, Portland, OR (US); Neil M. Schaper, Folsom, CA (US); Joseph Nuzman, Haifa (IL); Larisa Novakovsky, Haifa (IL); Yen-Cheng Liu, Portland, OR (US); Gilbert Neiger, Portland, OR (US); Raj K. Ramanujan, Federal Way, WA (US)

(73) Assignee: INTEL CORPORATION, Santa Clara, CA (US)

( * ) Notice: Subject to any disclaimer, the term of this patent is extended or adjusted under 35 U.S.C. 154(b) by 63 days.

(21) Appl. No.: 14/137,432

(22) Filed: Dec. 20, 2013

(65) Prior Publication Data

US 2015/0178202 A1    Jun. 25, 2015

(51) Int. Cl.
*G06F 12/08* (2016.01)

(52) U.S. Cl.
CPC ....... *G06F 12/0811* (2013.01); *G06F 12/0804* (2013.01); *G06F 12/0815* (2013.01); *G06F 12/0831* (2013.01); *G06F 2212/1032* (2013.01); *G06F 2212/222* (2013.01)

(58) Field of Classification Search
CPC .................. G06F 12/0811; G06F 12/0815
See application file for complete search history.

(56) References Cited

U.S. PATENT DOCUMENTS

| | | | |
|---|---|---|---|
| 2006/0136765 A1* | 6/2006 | Poisner | G06F 11/1441 713/323 |
| 2010/0180084 A1* | 7/2010 | Cypher | 711/135 |
| 2014/0040561 A1* | 2/2014 | Lih et al. | 711/135 |
| 2016/0034225 A1* | 2/2016 | Yoon | G06F 12/0868 711/102 |

* cited by examiner

*Primary Examiner* — Edward Dudek, Jr.
(74) *Attorney, Agent, or Firm* — Nicholson De Vos Webster & Elliott LLP

(57) ABSTRACT

An apparatus and method are described for performing a cache line write back operation. For example, one embodiment of a method comprises: initiating a cache line write back operation directed to a particular linear address; determining if a dirty cache line identified by the linear address exists at any cache of a cache hierarchy comprised of a plurality of cache levels; writing back the dirty cache line to memory if the dirty cache line exists in one of the caches; and responsively maintaining or placing the dirty cache line in an exclusive state in at least a first cache of the hierarchy.

21 Claims, 10 Drawing Sheets

METHOD AND APPARATUS FOR CACHE LINE WRITE BACK OPERATION

BACKGROUND

1. Field of the Invention

This invention relates generally to the field of computer processors. More particularly, the invention relates to an apparatus and method for implementing a cache line write back (CLWB) operation.

2. Description of the Related Art

Traditional computing architectures access code and data in two primary stores, volatile memory and persistent mass storage. Volatile memories such as static random access memory (SRAM) or DRAM are typically orders of magnitude faster (in terms of both latency and bandwidth) than persistent mass storage devices (e.g., magnetic disk, Flash). Volatile memory is directly attached to the CPU through a memory bus and hence directly accessible by CPU load/store instructions. Volatile memory has a higher cost/bit and limited capacity compared to mass storage.

Persistent mass storage, on the other hand, has significantly higher access latency and lower bandwidth compared to volatile memory. Mass storage is connected to the platform through an I/O controller (SCSI, SATA, PCI-Express, etc.), and can only be accessed through filesystem APIs, resulting in OS system calls. Persistent mass storage has much lower cost/bit and higher capacity compared to volatile memory.

Emerging "persistent memory" technologies blend the performance characteristics of volatile memory, with the cost, persistence, and capacity characteristics of mass storage. In particular, like mass storage, persistent memory is non-volatile. Persistent memory offers higher capacities compared to dynamic random access memory (DRAM) with a similar order of magnitude performance. Moreover, persistent memories are byte-addressable (as opposed to the page/block addressability of Flash memory), allowing them to be attached to the processor memory bus. As a result, using persistent memory, memory-intensive software can initialize faster, and save state information more quickly. Examples of persistent memory include Phase Change Memory (PCM), Phase Change Memory and Switch (PCMS), Memristor, and STT-RAM are examples of emerging persistent memory technologies.

With the emergence of persistent memory, new systems are being proposed where volatile and persistent memory are both part of the CPU addressable physical address space. In this scheme, volatile regions are managed by the operating system's virtual memory manager, and the persistent regions are managed separately from volatile memory through the operation system storage stack (i.e., the block driver and/or file system).

With such a persistent-memory architecture, system software and applications can access the non-volatile storage using regular load/store instructions, without incurring the overheads of traditional storage stacks (file systems, block storage, I/O stack, etc.). However, stores to persistent memory impose new challenges for software to enforce and reason about the "persistence" of stores. Specifically, there are a number of intermediate volatile buffers between the processor core and persistent memory (e.g., write-back buffers, caches, fill-buffers, uncore/interconnect queues, memory controller write pending buffers, etc.), and a store operation is not persistent until the data has reached some power-fail safe point at the persistent memory controller.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
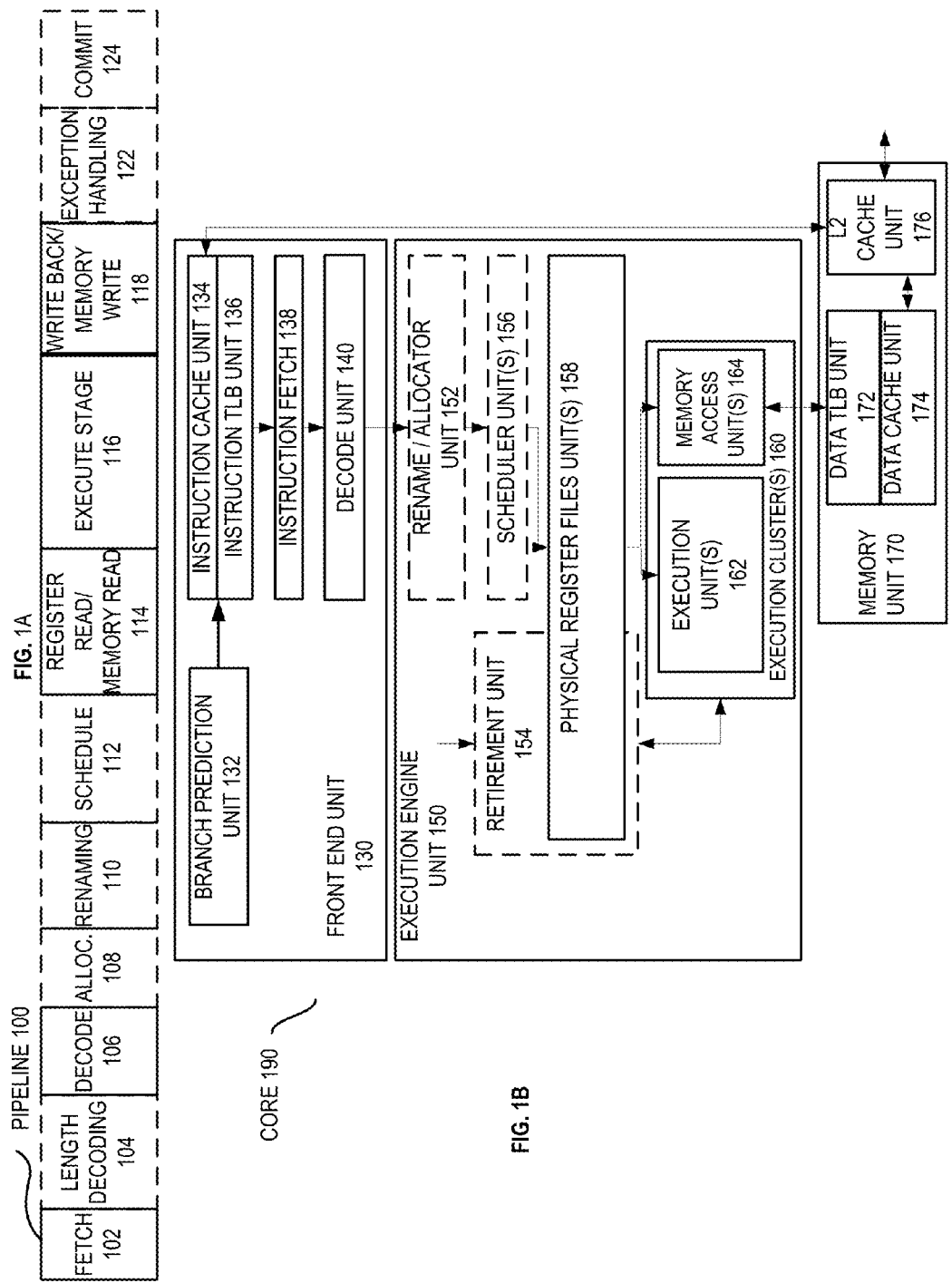
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/ execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
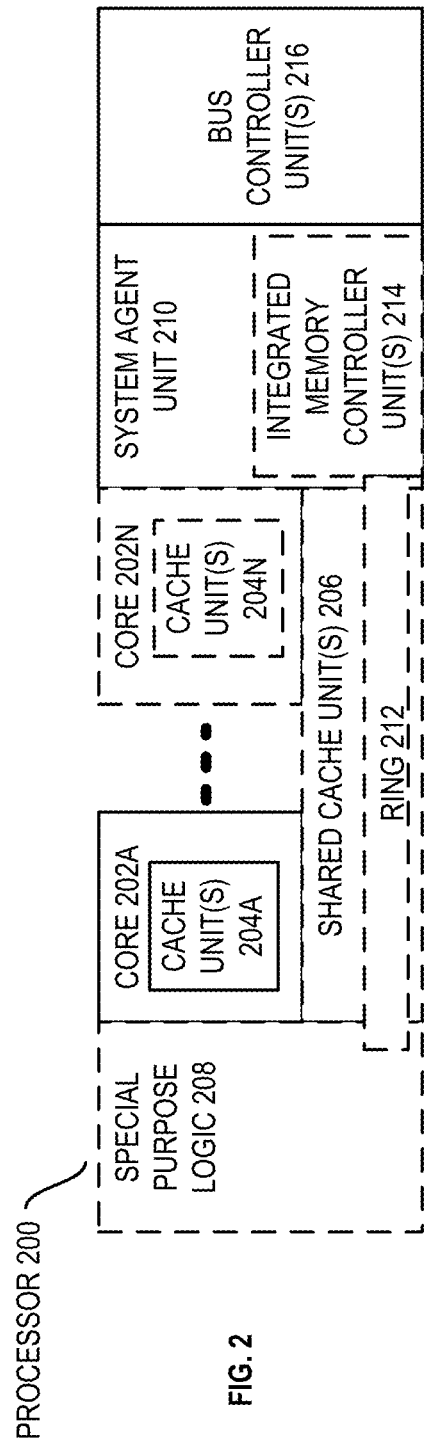
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
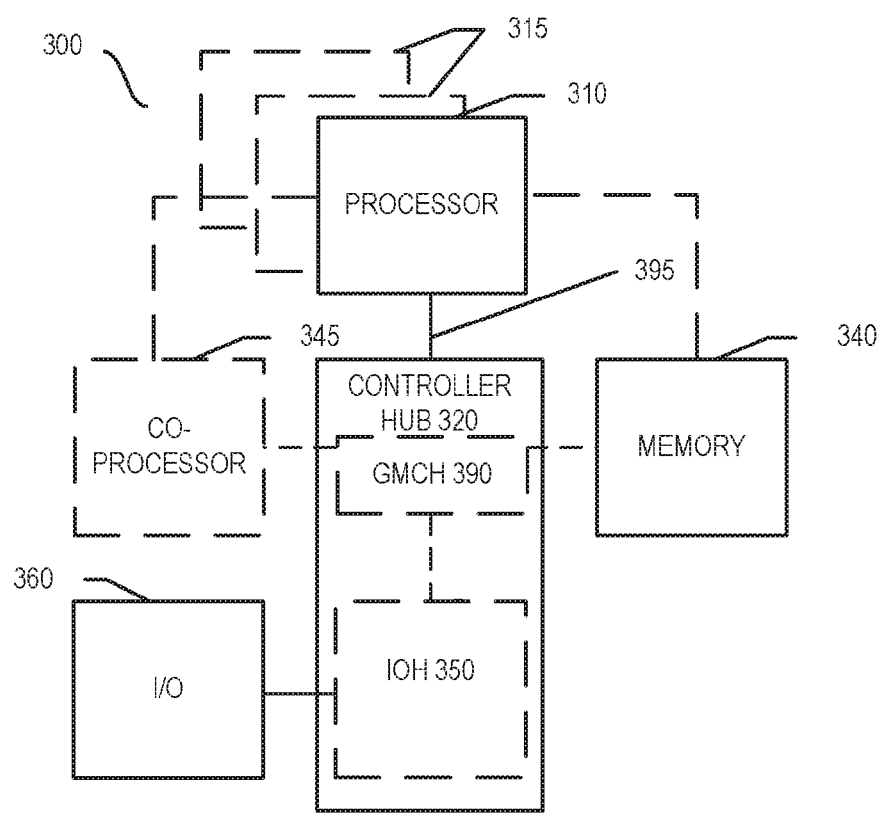
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
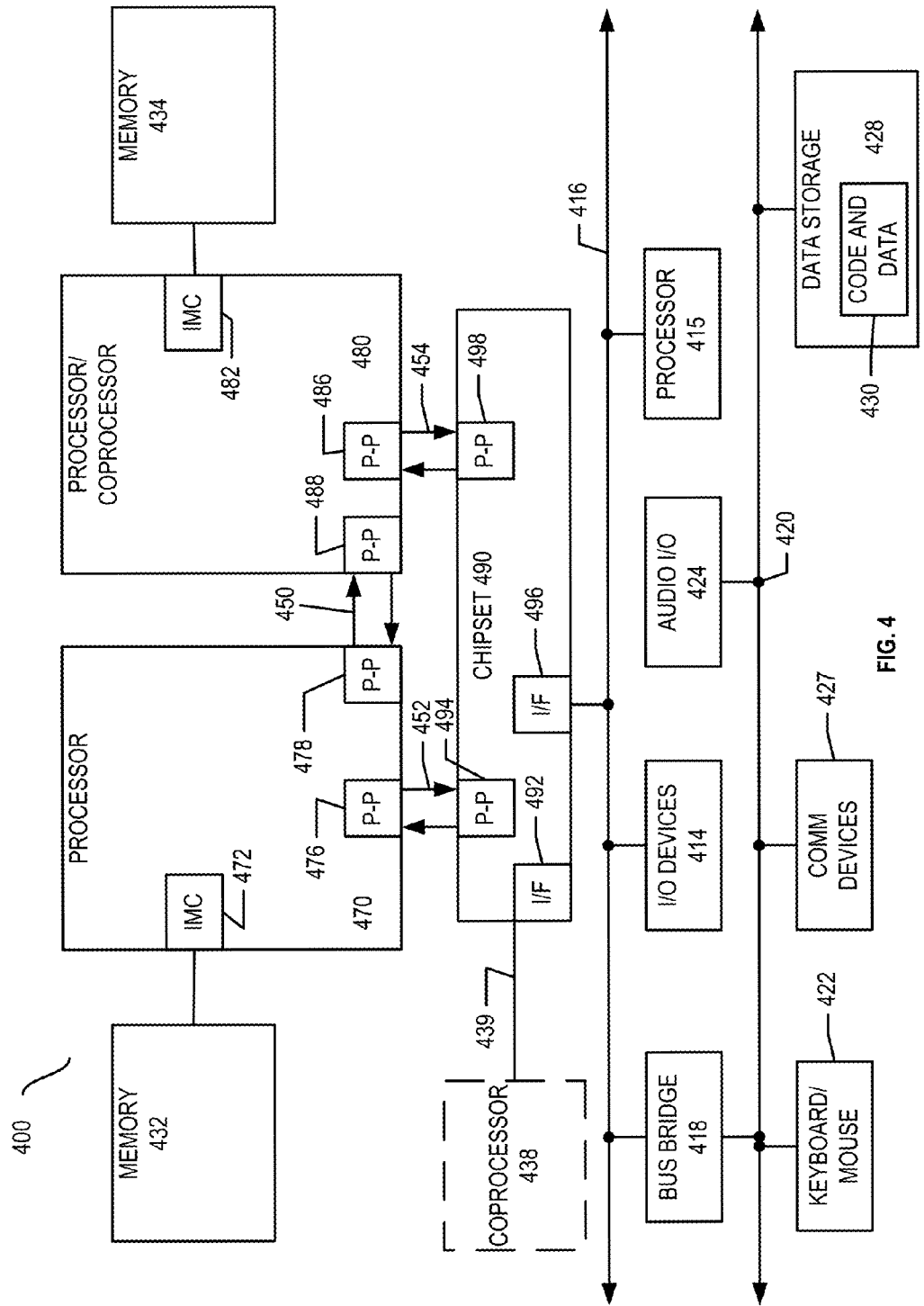
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
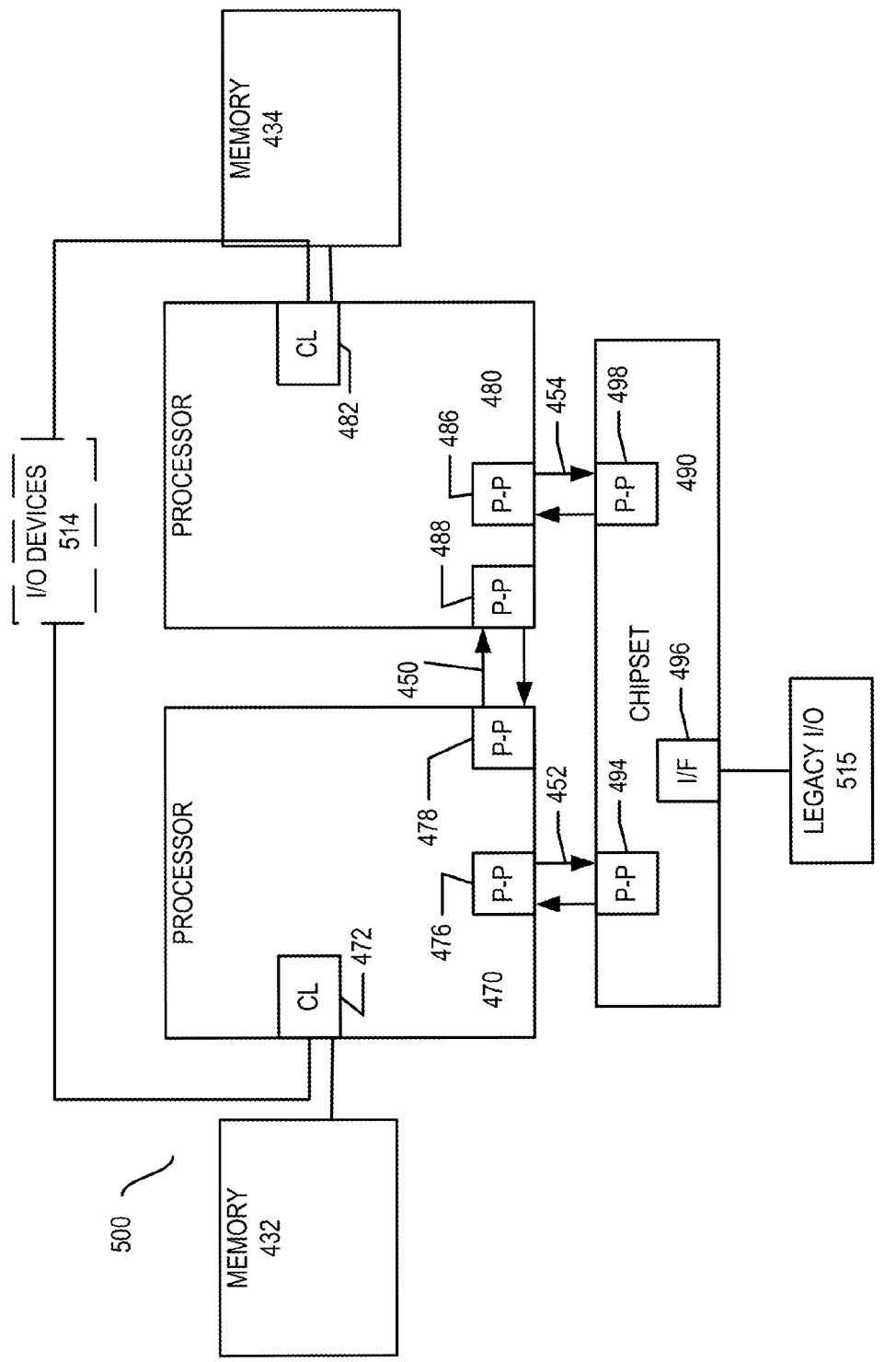
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
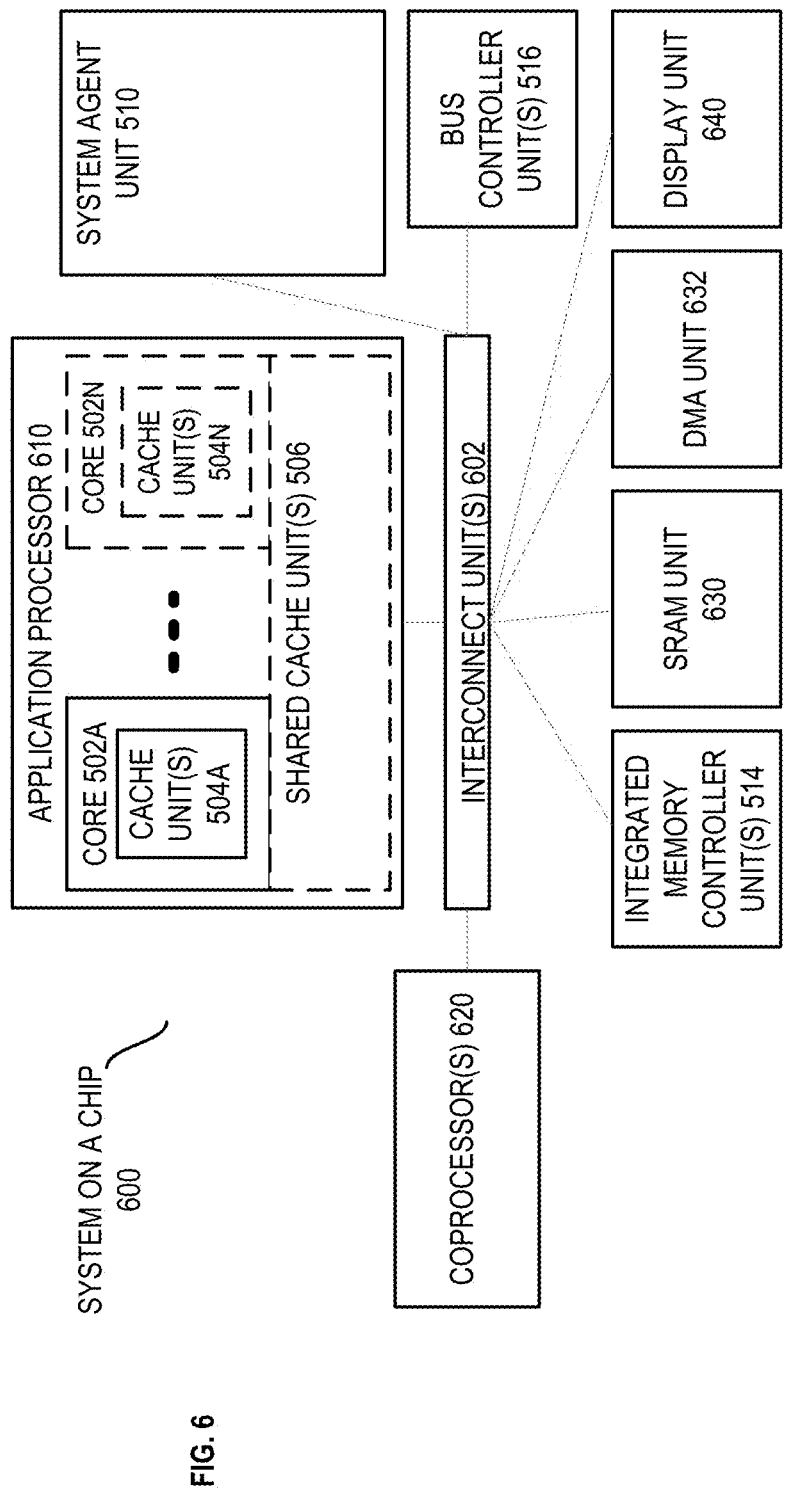
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
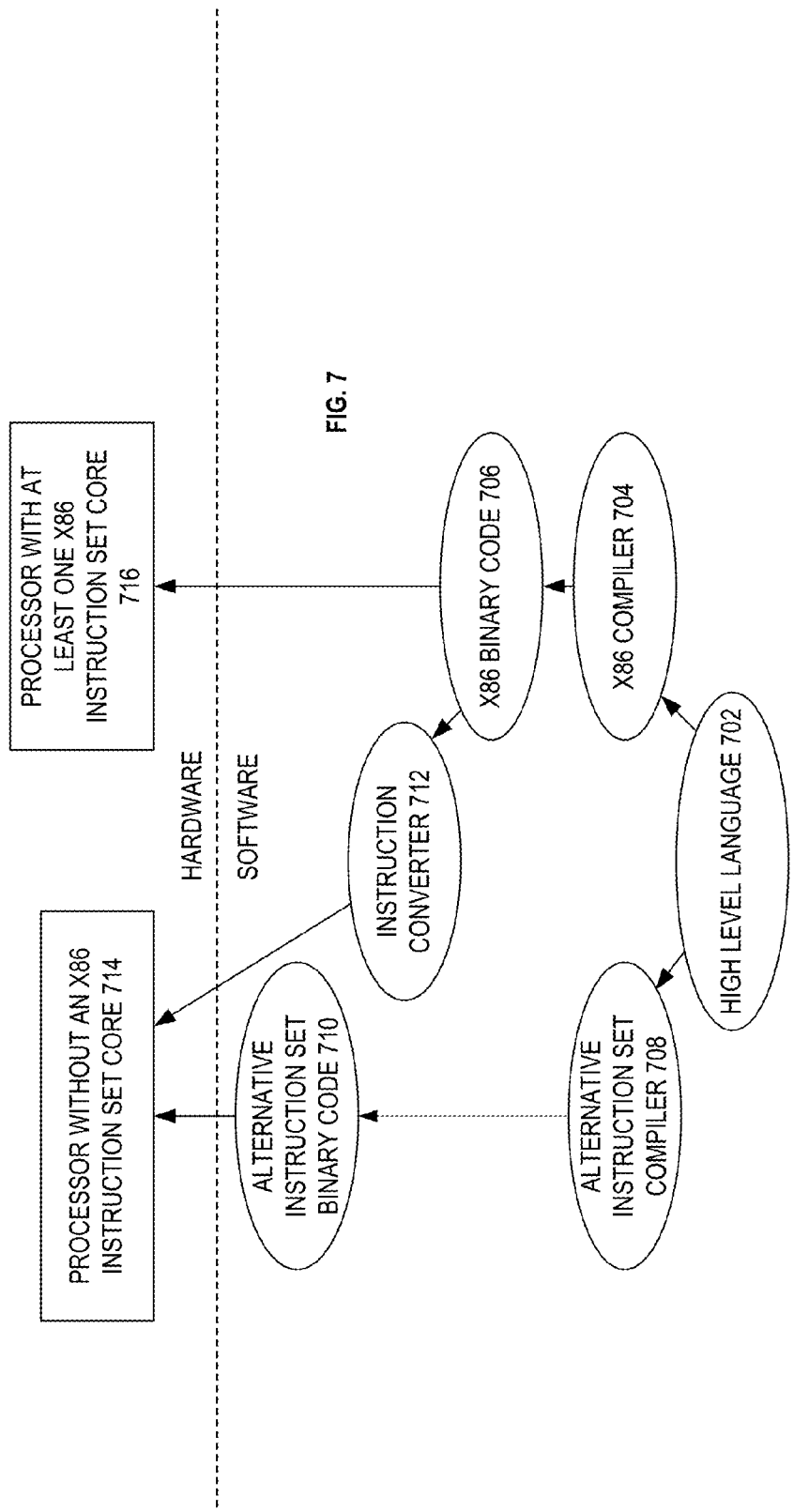
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for a Cache Line Write Back Operation

A high performance method and apparatus are described below which allow software to flush intermediate caches and enforce durability in a multi-core/multi-processor platform. Using these techniques, operation systems, applications, virtual machine managers (VMMs), and other software components are provided with a high performance mechanism for flushing processor caches.

One embodiment of the method and apparatus utilizes a new instruction, referred to herein as a Cache Line Write Back (CLWB) instruction to implement a performance-optimized mechanism to flush modified data from all caches to persistent memory. In one embodiment, the CLWB instruction is weakly ordered, allowing software to stream CLWB instructions. To ensure proper ordering, the CLWB instruction may be subject to store fencing. For example, a store fence (SFENCE) instruction may be used to performs a serializing operation on CLWB instructions and other store instructions that were issued prior the SFENCE instruction, thereby ensuring that every store instruction that precedes (in program order) the SFENCE instruction is globally visible before any store instruction that follows the SFENCE instruction is globally visible. In one embodiment, the SFENCE instruction is ordered with respect store instructions, other SFENCE instructions, any MFENCE instructions, and any serializing instructions (such as the CPUID instruction). It is not ordered with respect to load instructions or the LFENCE instruction.

Figure 8:
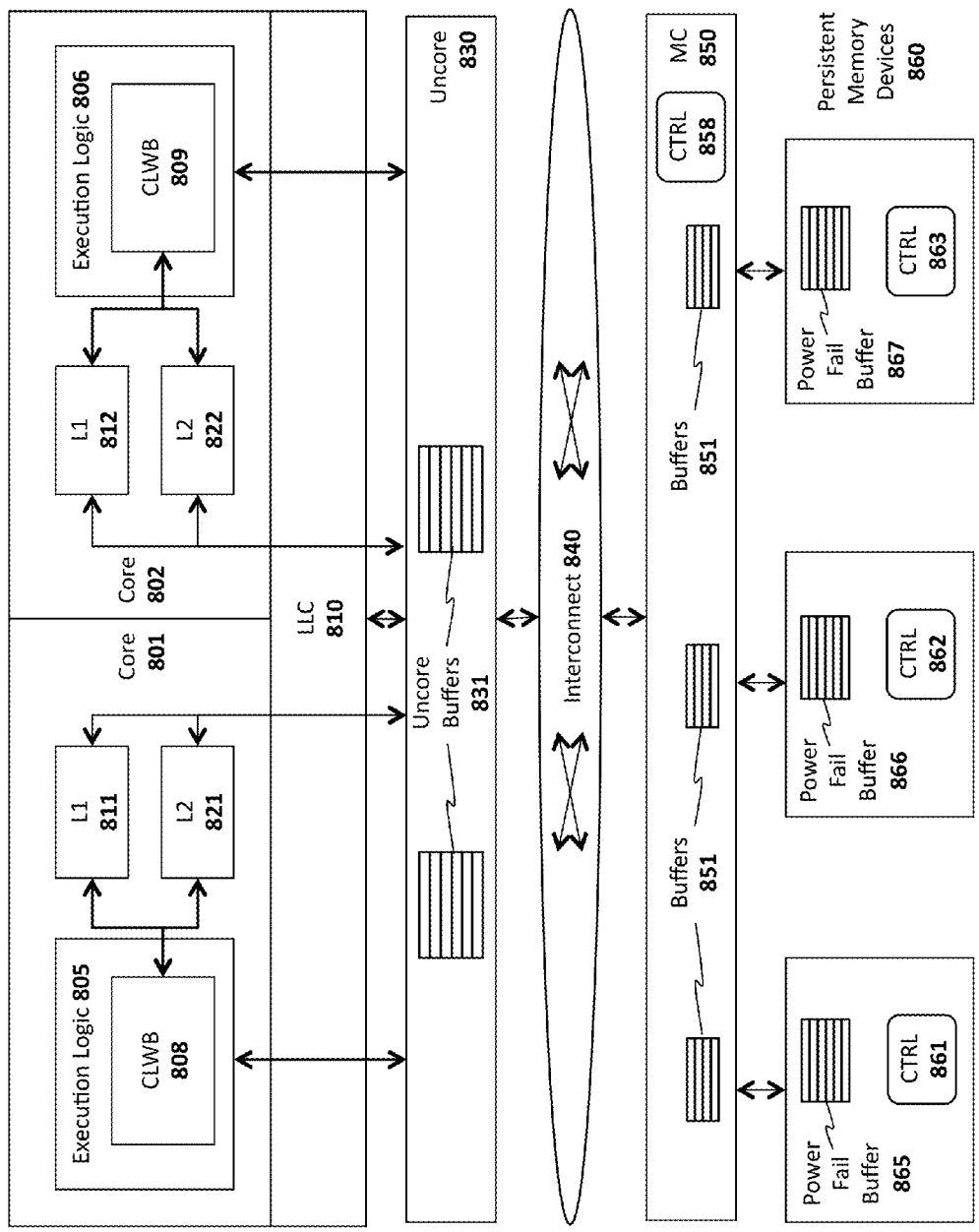
FIG. 8 illustrates a system architecture in accordance with one embodiment of the invention.

FIG. 8 illustrates one embodiment of a system architecture for implementing the CLWB instruction. This particular embodiment includes two cores 801-802, although the underlying principles of the invention are not limited to any particular number of cores. Core 801 includes execution logic 805 for executing instructions and processing data, a level 1 (L1) cache 811, and a level 2 (L2) cache 821. Similarly, core 802 includes execution logic 806, a L1 cache 812, and a L2 cache 822. The execution logic 805 and 806 of each core includes CLWB logic 808 and 809 for executing a CLWB instruction as described herein. A lower level cache (LLC) 810 caches instructions and data used by both of the cores, 801 and 802.

The illustrated embodiment also includes an "uncore" component 830 which may include control logic for coupling the cores 801-802 (and caches) to an interconnect 840 such as a quick path interconnect (QPI). In addition, the uncore component 830 may include cache management logic for implementing a memory/cache coherency protocol such as MESI, MOSI, or MOESI to ensure consistency between cache lines stored in the various caches and in system memory. The MESI states include Modified (M), Exclusive (E), Shared (S), and Invalid (I). The MOSI protocol utilizes the Owned (O) state in place of the Exclusive state and MOESI utilizes both the Exclusive and Owned states. These protocols are well known by those of skill in the art and the underlying techniques described herein for performing cache line write back operations are not limited to any particular cache coherency protocol.

As illustrated in FIG. 8, the uncore may also include buffers 831 for buffering transactions sent and received over the interconnect 840. For example, memory write transactions generated by the execution logic 805, 806 of the cores 801, 802, respectively, may be buffered within an uncore buffer 831 prior to transmission over the interconnect 840. Similarly, a memory read operation which reads data from system memory (e.g., in cache line blocks) may be temporarily buffered within an uncore buffer 831 prior to writing the data to one of the caches 811-812, 821-822, 810.

A memory controller 850 illustrated in FIG. 8 includes memory control logic 858 and may also one or more buffers 851 for buffering memory transactions as described herein. Returning to the above example, a memory write transaction may be temporarily stored in a memory controller write buffer 851 prior to transmission to one or more system memory devices, such as the persistent memory devices 860 shown in FIG. 8. Similarly, memory read from one of the persistent memory devices 860 may be temporarily buffered within the memory controller buffer 851 prior to transmission over the interconnect 840 (e.g., in response to a read transaction).

Three persistent memory devices 860 are illustrated in FIG. 8 for the purpose of illustration. It should be noted, however, that the memory controller 850 may also support one or more volatile memory devices such as DRAM (not shown) and coordinate read/write transactions directed to both the persistent memory devices 860 and volatile memory devices. For example, in one embodiment, the memory subsystem is composed of a two-level (2L) hierarchical arrangement in which the first level of memory (e.g., a volatile memory sometimes referred to as "near memory") functions as a memory-side cache for a second-level memory (e.g., a non-volatile or volatile memory sometimes referred to as "far memory").

Each persistent memory device 860 may include control logic 861-863 and a power fail buffer 865-867. In one embodiment, the power fail safe buffers provide a performance enhancement while ensuring that any transaction written to one of the buffers will be completed in the event of a power failure. As long as data from a memory transaction has been written to one of the fail safe buffers 865-867, it is assumed to be saved in memory, even in the event of a power failure. Thus, as illustrated in FIG. 8, there are numerous intermediate volatile buffers and caches positioned between each processor core and persistent memory. Consequently, a store operation is not persistent until the store data has reached some power-fail safe point at the persistent memory controller (e.g., the power fail buffers 865-867).

In one embodiment, the CLWB instruction takes a form such as CLWB [Linear Address] where the linear address is a source operand identifying the byte memory location of a particular cache line which may be stored in any level of the processor cache hierarchy. In one embodiment, the execution of the CLWB instruction does not invalidate the cache line written back to memory (i.e., does not change the state of the cache line to the Invalid (I) state). Rather, in one embodiment, modified lines which are written back to memory may remain in the cache in the Exclusive (E) state, indicating that the cache line is clean (i.e., it matches main memory) and is only present in the current cache. From the E state, the cache line may be changed to the Shared (S) state in response to a read request (indicating that the line is now shared across multiple caches) or may be changed to the Modified state (M) when the line is written to.

In some embodiments, the cache residency may be specifically selected for each cache level. For example, a core 801 may continue to invalidate the cache line from its L1 cache 811 and L2 cache 821, while the uncore 830 leaves the line in the LLC 810 in the E state. In addition, micro-architectural conditions may invalidate the line from any cache level, including the LLC 810 (e.g., in response to a "Hit M" in remote socket). Other embodiments of the invention may not include an LLC. In such embodiments, the cache line write-back may be used to retain the cache line in CPU's L1 or L2 caches.

In one embodiment, the CLWB instruction is implemented by broadcasting the write back request throughout the cache coherence domain. This broadcasting may be initiated, for example, by any one of the cores 801-802 via communication through the uncore component 830. If, at any level of the cache hierarchy, the line is inconsistent with memory (dirty) it is written to memory as described above, while maintaining the line in the Exclusive (E) state in at least one level.

Figure 9:
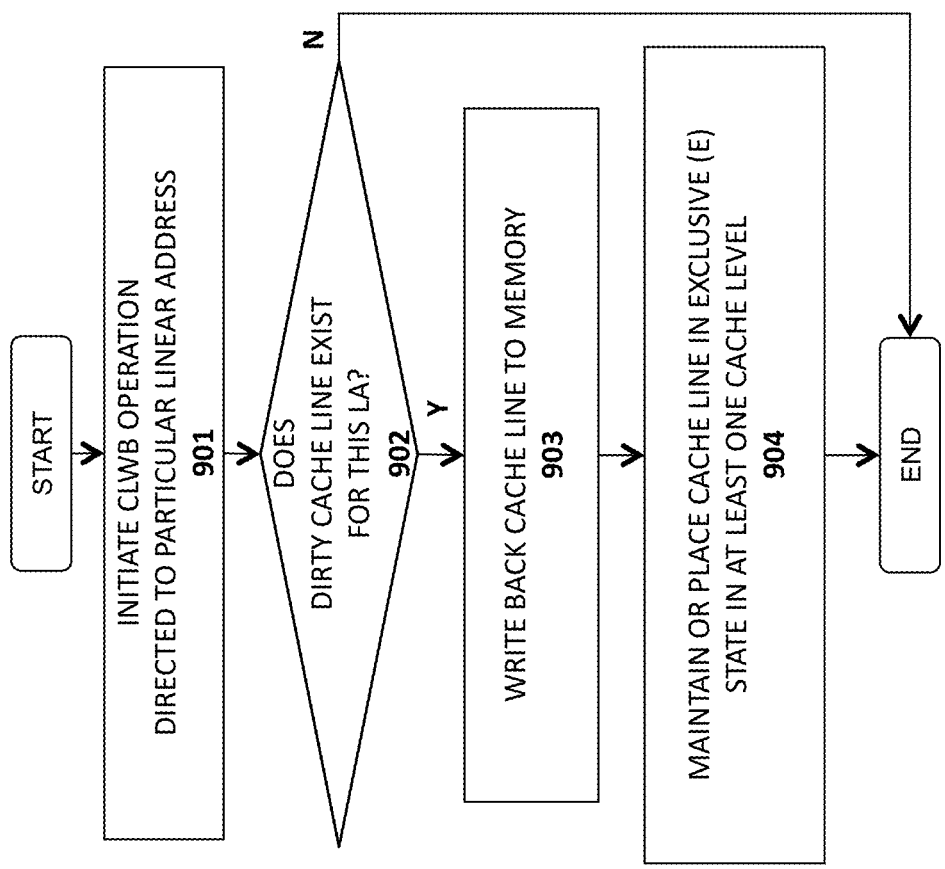
FIG. 9 illustrates a method in accordance with one embodiment of the invention.

FIG. 9 illustrates a method in accordance with one embodiment of the invention. At 901, the CLWB instruction is executed and is directed to a particular linear address which may identify a cache line. At 902, a determination is made as to whether this linear address identifies a cache line currently in the "dirty" state (i.e., in a state different from memory). If so, then at 903, the line is written back to memory. In contrast to prior implementations, however, the line is not invalidated from every cache level (unless other micro-architectural conditions warrant invalidation). Rather, at 904 the cache line is maintained or placed in the Exclusive (E) state in at least one cache level.

As mentioned above, in one embodiment, the CLWB instruction is executed in combination with a persistent commit (PCOMMIT) instruction to ensure that the data is successfully written to persistent storage. In addition, CLWB may be ordered by store fencing operations. It is not guaranteed to be ordered by any other serializing instructions, or by CLFLUSH or another CLWB instruction. For example, software can use an SFENCE, MFENCE, XCHG or LOCK-prefixed instruction to ensure that previous stores are included in the write-back.

Figure 10:
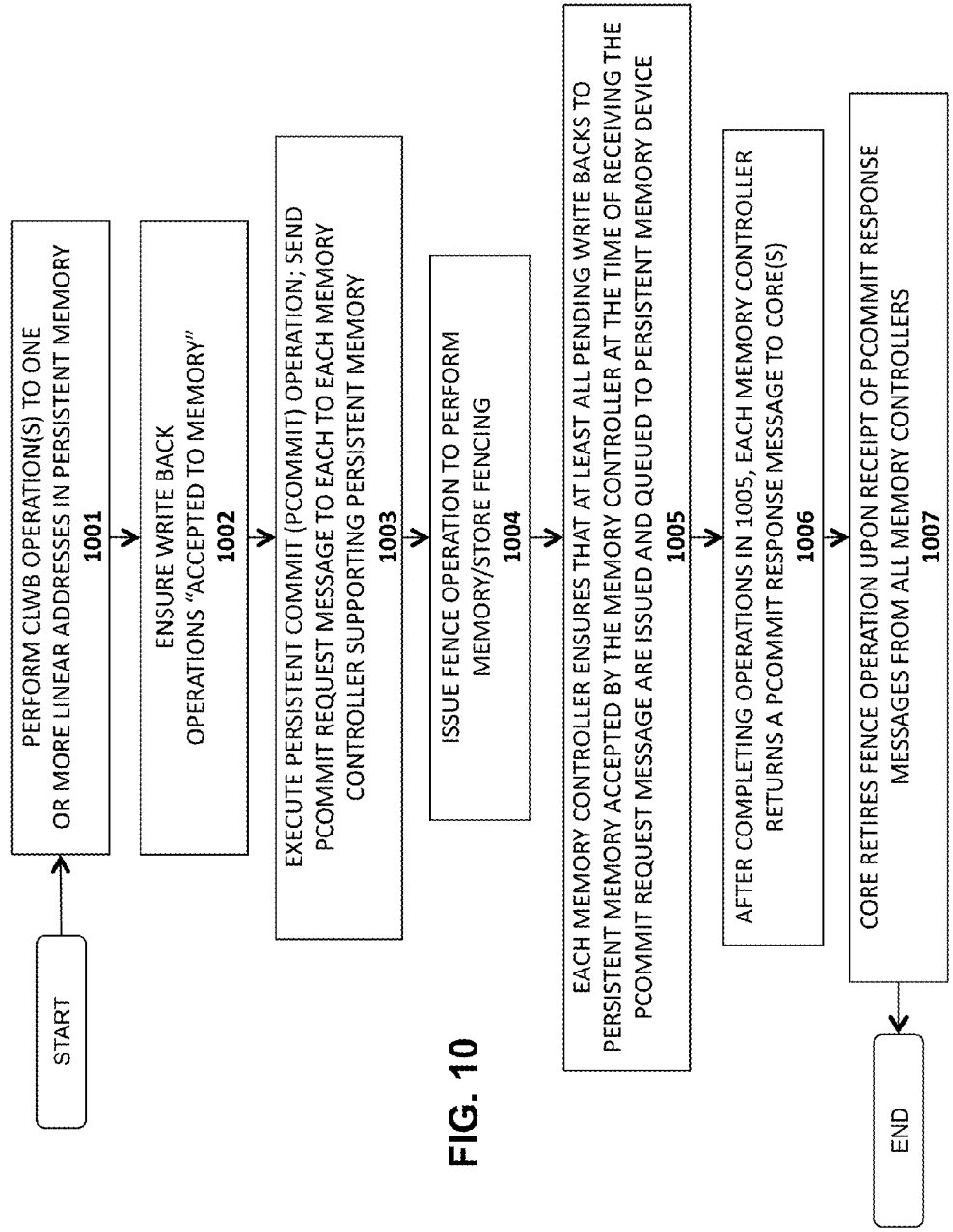
FIG. 10 illustrates a method in which one embodiment of the CLWB instruction is executed in combination with PCOMMIT and fence instructions.

FIG. 10 one embodiment of a method in which the CLWB instruction is executed in combination with PCOMMIT and fence instructions. At 1001, the CLWB instruction is performed and directed to one or more linear addresses in persistent memory (see, e.g., FIG. 9). At 1002, software ensures that the write back operations are accepted to memory for appropriate cache-line addresses using a FENCE operation to ensure ordering. At the retirement of the FENCE operation, the write back operations are guaranteed to be at least at the global ordering point (e.g., the memory controller write buffers 851), but are not guaranteed to be persistent.

At 1003, a the software executes a PCOMMIT instruction on one of the cores 801-802. On executing the PCOMMIT instruction, the processor core may initiate a PCOMMIT Request (REQ) message to each MC 850 hosting persistent memory in the system. To facilitate this, in one embodiment, a complete list of MCs supporting persistent memory is configured as part of the platform initialization process (e.g., by the initialization firmware).

In one embodiment, the broadcast of PCOMMIT REQ to the target MCs may be performed directly by the processor core or microcode. In another embodiment, the broadcast and collection of responses for these requests may be offloaded from the processor cores 801-802 to uncore logic 830. In an uncore implementation additional opportunities are provided to coalesce multiple in-flight PCOMMIT requests from multiple cores to the same MC, thus reducing overhead.

At 1004, the software issues a FENCE operation that performs memory/store fencing. The fencing operation of this embodiment has at least two effects: (a) it ensures that the weakly-ordered PCOMMIT instruction has retired and the PCOMMIT REQ messages were indeed issued out of the processor core; and (b) it guarantees that the core has received a PCOMMIT RESP (completion) for each of the PCOMMIT REQ messages issued to the various MCs, which confirms that the stores have becomes persistent.

At 1005, on receiving a PCOMMIT REQ message at a MC, the respective MC ensures a PCOMMIT RESP message is returned back only after at least all pending write backs to persistent memory already accepted by the MC at the time of accepting the PCOMMIT REQ are issued and queued to the persistent memory device without any errors. The MC may accomplish this in multiple ways. In one embodiment, the MC accomplishes this by using the PCOMMIT REQ message as a marker to identify the pending write backs to persistent memory in its write pending buffer that are older. In this scheme, as the older requests gets dispatched to the persistent memory device, the PCOMMIT REQ eventually reaches the head of the queue at which point a PCOMMIT RESP is returned by the MC. In another embodiment, on accepting a PCOMMIT REQ, the MC takes a snapshot of the write pending queue and returns a PCOMMIT RESP only after all write back to persistent memory in the snapshot are dispatched and queued to the persistent memory device without errors.

At 1006, each MC returns a PCOMMIT RESP message once the persistent memory devices have accepted the writes and the write back data is guaranteed to be in power fail protected domain. The signaling between MC and persistent memory ensures that the write back data has reached the persistent memory device without any ECC errors. In case of partial writes, the read-modify-write operation used to process each partial write is guaranteed to have completed to the persistent memory device without errors. In one embodiment, the persistent memory device includes intermediate power-fail safe write buffers, which have guaranteed residual energy to push the pending writes to the persistent media in case of a power fail indication from the platform. The residual energy budget needs to carefully factor in any transient error conditions at the persistent media that requires retries and any wear-leveling overheads that may be incurred on writes to persistent media. Power-fail protected write buffers in persistent memory devices are optional and used only to improve write bandwidth.

At 1007, the core retires the FENCE instruction when it receives the PCOMMIT RESP for all the PCOMMIT REQ messages to the various MCs, and the resumes normal program execution. From the software perspective, write backs are guaranteed to be persistent when the FENCE operation completes. Depending on the FENCE operation used, software is also guaranteed subsequent memory/store operations following the FENCE instruction in program order are executed only after the FENCE retires.

As mentioned above, the memory subsystem may include a two-level (2L) hierarchical arrangement in which the first level of memory (e.g., a volatile memory sometimes referred to as "near memory") functions as a memory-side cache for a second-level memory (e.g., a non-volatile or volatile memory sometimes referred to as "far memory"). In such an arrangement, the write back operation generated in response to a CLWB execution may be tracked by the memory side cache to ensure that the data being written is forwarded to the second-level memory before completing a subsequent PCOMMIT response.

The CLWB operation may be beneficial in numerous contexts. For software using a two-phase commit protocol such as described herein may be used to avoid torn writes to persistent memory, where software first writes data to a cacheline which may be torn by hardware as multiple writes. This two-phase commit includes, for example, a FLUSH from processor caches, followed by the FENCE-PCOMMIT-FENCE sequence to persist the data, followed by writing metadata to the cacheline, and completing another set of FLUSH-FENCE-PCOMMIT-FENCE operations. In this example, if the existing cache flush operation (such as CLFLUSH) is used to flush the cacheline, the metadata write in above sequence would always insure a cache miss, imposing more latency. This can be avoided through the use of CLWB, which not only flushes the data to memory, but makes sure that the data is left in the E-state in the processor caches.

Another example of the benefits of the CLWB instruction is a usage with volatile memory, where software is repeatedly using a buffer to write data (which are allocated into the processor caches) and flush the data from caches to make them visible to some I/O agent (such as a display or remote display such as WiDi) that performs non-snooped memory reads to process the data. In this scheme, each iteration causes CPU writes to miss the caches if normal cache flush instructions are used. Instead, with the use of CLWB, these compulsory cache misses can be avoided.

In one embodiment, the availability of CLWB is indicated by the presence of a CPUID feature flag and the aligned cache line size affected is indicated with the CPUID instruction. The memory attribute of the page containing the affected line has no effect on the behavior of this instruction. It should be noted that processors are free to speculatively fetch and cache data from system memory regions assigned a memory-type allowing for speculative reads (such as, the WB, WC, and WT memory types). PREFETCH instructions can be used to provide the processor with hints for this speculative behavior. Because this speculative fetching can occur at any time and is not tied to instruction execution, the CLWB instruction is not ordered with respect to PREFETCH instructions or any of the speculative fetching mechanisms (that is, data can be speculatively loaded into a cache line just before, during, or after the execution of a CLWB instruction that references the cache line).

In one embodiment, the CLWB instruction can be used at all privilege levels and is subject to all permission checking and faults associated with a byte load (and in addition, a CLWB instruction is allowed to write-back a linear address in an execute-only segment). Like a load, the CLWB instruction may set the A bit but not the D bit in the page tables.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method implemented in a processor, comprising:
    initiating a cache line write back operation directed to a particular linear address;
    determining if a dirty cache line identified by the linear address exists at any cache of a cache hierarchy comprised of a plurality of cache levels;
    writing back the dirty cache line to memory if the dirty cache line exists in one of the caches; and
    responsively maintaining or placing the dirty cache line in an exclusive state in at least a first cache of the hierarchy,
    wherein the memory comprises a persistent memory device that is attached to a processor memory bus of the processor, the method further comprising ensuring that the dirty cache line is successfully written to the persistent memory device, including:
    sending a request message to one or more memory controller instructing the one or more memory controllers to confirm that the write back operations are successfully committed to the persistent memory device;
    ensuring at the one or more memory controller that at least all pending write back operations received at the time of the request message will be committed to the persistent memory device; and
    sending a response message from the one or more memory controller indicating that the write back operations are successfully committed to the persistent memory device.

2. The method as in claim 1 further comprising:
    invalidating the cache line in at least a second cache of the cache hierarchy while maintaining or placing the dirty cache line in an exclusive state in the first cache.

3. The method as in claim 1 wherein the cache hierarchy comprises a level 1 (L1) cache and a level 2 (L2) cache each associated with a core, and a lower level cache (LLC) shared by each of a plurality of the cores.

4. The method as in claim 3 wherein the cache line is maintained or placed in the exclusive state within the LLC but is invalidated in the L1 and/or L2 caches.

5. The method as in claim 1 wherein the cache hierarchy comprises a level 1 (L1) cache and a level 2 (L2) cache, wherein the cache line is maintained or placed in the exclusive state within the L1 or L2 cache.

6. The method as in claim 1 wherein the one or more memory controllers manage a two-level (2L) hierarchical memory arrangement in which a first level of volatile memory functions as a memory-side cache and a second-level memory includes a non-volatile memory, wherein the writing back of the dirty cache line is tracked to ensure that data being written is forwarded to the second-level memory before sending the response message.

7. The method as in claim 1 further comprising:
    initially ensuring that the write back operations have been accepted to memory prior to ensuring that the write back operations have been committed to the persistent memory device.

8. The method as in claim 1 further comprising:
    executing a persistent commit instruction to cause the request message to be sent to the one or more memory controllers, the persistent commit instruction being retired only after receiving the response message.

9. The method as in claim 8 wherein the persistent commit instruction and cache line write back operation are weakly ordered, the method further comprising:
    issuing a fence operation to perform memory/store fencing associated with issuance of the persistent commit and cache line write back instructions.

10. The method as in claim 9 wherein the fence operation ensures that the weakly-ordered instructions have retired and the request messages issued to the one or more memory controllers.

11. The method as in claim 10 wherein the fence operation further guarantees that a response message has been received for each of the request messages issued to the one or more memory controllers, thereby confirming that the write back operations have become persistent.

12. A processor comprising:
cache line write back logic to initiate a cache line write back operation directed to a particular linear address;
cache management logic to determine, responsive to the cache line write back operation, if a dirty cache line identified by the linear address exists at any cache of a cache hierarchy comprised of a plurality of cache levels;
the cache management logic to write back the dirty cache line to memory if the dirty cache line exists in one of the caches and to responsively maintain or place the dirty cache line in an exclusive state in at least a first cache of the hierarchy responsive to the cache line write back operation;
memory comprising a persistent memory device that is attached to a processor memory bus of the processor; and
one or more memory controllers to ensure that the dirty line is stored in the persistent memory device responsive to the cache line write back operation, wherein to ensure that dirty cache line is successfully written to the persistent memory device, the memory controller is configured to receive a request message instructing the memory controller to confirm that the write back operation is successfully committed to the persistent memory device, ensure that at least all pending write back operations received at the time of the request message will be committed to the persistent memory device, and send a response message indicating that the write back operations are successfully committed to the persistent memory device.

13. The processor as in claim 12 wherein the cache management logic is configured to invalidate the cache line in at least a second cache of the cache hierarchy while maintaining or placing the dirty cache line in an exclusive state in the first cache responsive to the cache line write back operation.

14. The processor as in claim 12 wherein the cache hierarchy comprises a level 1 (L1) cache and a level 2 (L2) cache each associated with a core, and a lower level cache (LLC) shared by each of a plurality of the cores.

15. The processor as in claim 14 wherein the cache line is maintained or placed in the exclusive state within the LLC but is invalidated in the L1 and/or L2 caches responsive to the cache line write back operation.

16. The processor as in claim 12 wherein the cache hierarchy comprises a level 1 (L1) cache and a level 2 (L2) cache, wherein the cache line is maintained or placed in the exclusive state within the L1 or L2 cache.

17. The processor as in claim 12 wherein the one or more memory controllers are to initially ensure that the cache line write back operations have been accepted to the persistent memory device prior to ensuring that the write back operations have been committed to the persistent memory device.

18. The processor as in claim 12 further comprising:
persistent commit logic to execute a persistent commit instruction to cause the request message to be sent to the one or more memory controllers, the persistent commit instruction to be retired only after receiving the response message.

19. The processor as in claim 18 wherein the persistent commit instruction and cache line write back operation are weakly ordered, the processor further comprising:
instruction fence logic to issue a memory fence instruction to perform memory/store fencing associated with issuance of the persistent commit instruction and cache line write back operation.

20. The processor as in claim 19 wherein the memory fence instruction ensures that the weakly-ordered instructions have retired and the request messages issued to the one or more memory controllers.

21. The processor as in claim 20 wherein the memory fence instruction further guarantees that a response message has been received for each of the request messages issued to the one or more memory controllers, thereby confirming that the write back operations have become persistent.

* * * * *